US010637832B2

(12) United States Patent
Shmuylovich et al.

(10) Patent No.: US 10,637,832 B2
(45) Date of Patent: Apr. 28, 2020

(54) METHOD AND APPARATUS PROVIDING A FRAMEWORK FOR SECURE INFORMATION LIFECYCLE

(75) Inventors: Samuil Shmuylovich, Framingham, MA (US); Boris Farizon, Westborough, MA (US); Anoop George Ninan, Milford, MA (US); Robert A. Lincourt, Jr., Pawtucket, RI (US); Svetlana Patsenker, Wayland, MA (US); Aleksandra A. Messier, Somerset, MA (US); Min Yin, Bolton, MA (US); Eugenio Korolev, Framingham, MA (US); Rajesh K. Gandi, Shrewsbury, MA (US); Pramod Kulyadi Pai, Mangalore (IN); Venkat R. Tiruveedi, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1423 days.

(21) Appl. No.: 12/325,438

(22) Filed: Dec. 1, 2008

(65) Prior Publication Data

US 2010/0083369 A1 Apr. 1, 2010

(30) Foreign Application Priority Data

Sep. 30, 2008 (IN) .......................... 2407/CHE/2008

(51) Int. Cl.
*H04L 29/06* (2006.01)
*G06F 21/62* (2013.01)
*H04L 9/08* (2006.01)

(52) U.S. Cl.
CPC ...... *H04L 63/0428* (2013.01); *G06F 21/6209* (2013.01); *G06F 21/6218* (2013.01); *H04L 9/0894* (2013.01); *G06F 2221/2107* (2013.01)

(58) Field of Classification Search
CPC ......... G06F 21/6209; G06F 2221/2107; G06F 21/6218; H04L 63/0428; H04L 63/083; H04L 9/0894
USPC .............. 726/16–18, 1–6; 713/150; 380/255; 717/108
See application file for complete search history.

(56) References Cited

U.S. PATENT DOCUMENTS

| 6,353,859 B1 * | 3/2002 | McKeehan | ............. G06F 9/541 719/315 |
| 7,536,712 B2 * | 5/2009 | Kaler | .................... H04L 63/123 713/186 |

(Continued)

*Primary Examiner* — Linglan E Edwards
(74) *Attorney, Agent, or Firm* — Ryan, Mason & Lewis, LLP

(57) ABSTRACT

A method, apparatus and computer program product for handling secure information (e.g., a password, an account number, a personal identification number (PIN), a user identifier, an encryption key, and a path where said secure information is stored) is presented. Secure information is stored in a software container. A plurality of representations of the secure information is provided, each of the plurality of representations for use under different conditions. Dependent on the particular condition, at least one of the plurality of representations of the secure information is provided by the container. The container holds the secure information during all stages of processing in a manner that prevents unauthorized parties from gaining access to the secret in clear form.

21 Claims, 3 Drawing Sheets

(56) References Cited

U.S. PATENT DOCUMENTS

| | | | | |
|---|---|---|---|---|
| 8,094,812 | B1* | 1/2012 | Tsang | H04L 9/3226 |
| | | | | 380/28 |
| 8,261,345 | B2* | 9/2012 | Hitomi | G06F 9/468 |
| | | | | 726/22 |
| 2006/0225137 | A1* | 10/2006 | Odins-Lucas | G06F 21/51 |
| | | | | 726/27 |
| 2006/0235876 | A1* | 10/2006 | Plouffe, Jr. | G06F 9/4435 |
| 2007/0006325 | A1* | 1/2007 | Gargaro | G06F 21/6218 |
| | | | | 726/27 |
| 2008/0072053 | A1* | 3/2008 | Halim | H04L 63/0815 |
| | | | | 713/176 |
| 2008/0077978 | A1* | 3/2008 | Repasi | G06F 21/36 |
| | | | | 726/5 |
| 2008/0301762 | A1* | 12/2008 | Malcolm | G06F 21/606 |
| | | | | 726/1 |
| 2009/0293119 | A1* | 11/2009 | Jonsson | G06F 21/36 |
| | | | | 726/19 |

\* cited by examiner

METHOD AND APPARATUS PROVIDING A FRAMEWORK FOR SECURE INFORMATION LIFECYCLE

RELATED APPLICATIONS

This application is related to and claims the benefit under 35 U.S.C. § 119 of India Patent Application Serial Number 2407/CHE/2008, filed on Sep. 30, 2008, and entitled "Method and Apparatus Providing a Framework for Secure Information Lifecycle," the entire teachings of which are incorporated herein by this reference.

BACKGROUND

As a user interacts with a computer system and computing environment, often times secure information is used. Examples of secure information include, but are not limited to, usernames, passwords, Personal Identification Numbers (PINs), account numbers, user-identifiers, encryption keys, paths where secure information is stored, and the like. For example, a user logging into a computer system may enter a username and a password associated with the username. In this case the password is the secure information. When the user enters the password, the actual password is not reflected back in the display, but instead a character string (e.g., a string of asterisks) is displayed. One reason this is done is so that the user's password is kept secret, and that someone viewing the display cannot discern the users password. With respect to transmission of messages across a network, a secure network connection may be used. In this case, the entire message, which includes the secure information in the payload of a message, may be encrypted before transfer across the network. Upon reception of the encrypted message, the message is then unencrypted.

SUMMARY

Conventional mechanisms such as those explained above suffer from a variety of deficiencies. One such deficiency is that conventional computer environments do not always provide protection for secure information.

Computer system may include multiple processes running on several computers. For example, in the case of a storage management system it includes console, server, central database, and agents. One of the examples of a secret is so called "access information" which consists of a user name and a password which is entered by the user and is passed to an agent to perform certain actions on a management entity. The usual data flow for such a secret would be: from the user entering the information into the console—to the server and from the sever—to the agent. Along this route the secret could be stored in database, in a file, or it could be logged into log file. The only real recipient of the secret is an agent. All other components (console, server, database, log file) do not need to know a clear representation of the secret. Currently, communications between computer systems can be secured (e.g. SSL) but there are no generic approaches to secure information in the process memory. In the above example, console, server, and agent processes would have copies of a secret's clear representation in the process memory as well as any of these processes may write it into a log file.

As described earlier, a user logging into a computer system may enter a username and a password associated with the username, wherein the password is the secure information. When the user enters the password, the actual password is not reflected back in the display, but instead a character string (e.g., a string of asterisks) is displayed. While this provides security from someone viewing the display it does not provide complete security. In this example, a clear text version of the secure information is available in process memory of the console computer, and may reside there unprotected for a period of time. A nefarious party may get control of the computer and obtain this clear text version of the secure information.

With respect to transmission of messages across a network, a secure network connection may not be used. In this case, the entire message, which includes the secure information in a payload of a message, is transferred across the network. The secure information is available in a clear text form and may be accessed by a nefarious party by snooping the network or by intercepting the message.

Similar examples of potential access to secure information can occur throughout a computer environment. These include secret information stored at servers, in persistent memory such as a database, in log files and in response to certain queries.

Embodiments of the invention significantly overcome such deficiencies and provide mechanisms and techniques that provide for secure handling of information. The presently described method and apparatus providing a framework for secure information utilizes a container that holds a secure information (referred to herein as a secret) during all stages of a computer processing in a manner that prevents unauthorized parties from gaining an access to the secret in a clear form. A solution is provided which keeps secure information protected in memory of infrastructure processes, console processes, agent processes, persistent storage and the like. Further, logging of secure information is either eliminated or the secure information is replaced with a text string such that the secure information is not discernable from the text string. Secure information should not be placed in strings, as strings are immutable and can remain in memory until a garbage collection process is invoked. Further, secure information is protected in transmission of payloads of messages across communications paths such as networks.

In a particular embodiment of a method for providing secure information, the method includes storing secure information in a software container. The method further includes providing a plurality of representations of the secure information with the container, each of the plurality of representations for use under different conditions. The method additionally includes providing at least one of the plurality of representations of the secure information from the container.

Other embodiments include a computer readable medium having computer readable code thereon for providing secure information. The computer readable medium includes instructions for storing secure information in a software container. The computer readable medium further includes instructions for providing a plurality of representations of the secure information with the container, each of the plurality of representations for use under different conditions. The computer readable medium additionally includes instructions for providing at least one of the plurality of representations of the secure information from the container.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides handling of secure information as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing handling of secure information as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by EMC, Inc., of Hopkinton, Mass.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the presently described method and apparatus providing a framework for secure information lifecycle utilize a software container which allows input, processing, distribution, and storing of a secret in a manner that prevents secret appearance in a clear form without explicit request from the application. By doing so, we are guaranteed that the secret cannot be uncovered by a hostile intrusion, for example, by analyzing process memory and/or log files. This container holds information in an encrypted form and has the ability to be transported, stored (on a number of storage types, e.g. database, file end so on), and manipulated in a form that does not reveal clear form of a secret. To retrieve a clear form of a secret an application must explicitly request this functionality from the container. The above-mentioned characteristics of the container are container's features and do not require any additional support from an application. The container can be queried for a different representation of a secret, e.g. wire format—for distribution over the wire, database format—for storing in the database, file format—for storing in the file, log format—for writing to a log file, and, finally, to clear format—to be used by an application in the case when a clear format is required. The container itself can be passed from one application component to another in the same process space or to another process with out revealing clear representation of the secret. By introducing the secret container an application has ability to control a representation form of the secret. It controls what form of a secret should be used in any use case. The container holds the secure information during all stages of processing in a manner that prevents unauthorized parties from gaining access to the secret in clear form. All components may reside on one computer or occupy different computers. Communication paths could be any network connection between components or interprocess communication between processes on the same computer.

Figure 1:
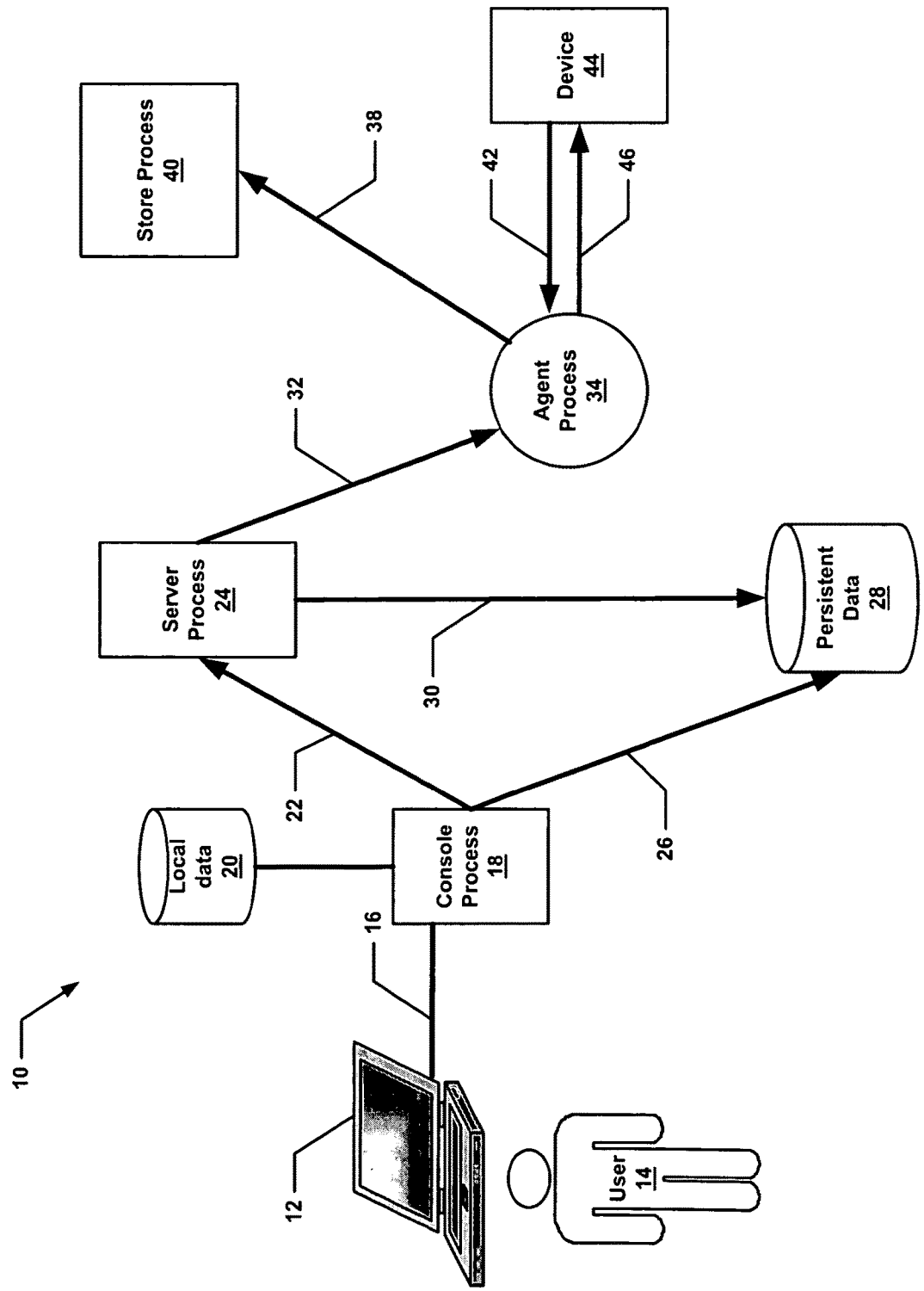
FIG. 1 illustrates a system diagram showing the different types and uses of secure information in a computer environment.

Referring now to FIG. 1, a computer environment 10 is shown. In this example the computer environment is realized as EMC's Control Center (ECC), available from EMC Corporation of Hopkinton, Mass. ECC includes agents that are deployed on storage elements for the purpose of gathering data about these elements, components that process and persist data, applications that use persisted information to enable the management of these environments. Computer environment 10 includes a user 14 accessing a computer 12. The computer includes a console 18 and local data storage device 20. The console 18 is in communication with a server process 24 by way of a communications path 22. Console 18 is also in communication with persistent data 28 by way of communications path 26. Server process 24 is in communication with persistent data 28 by way of communications path 30.

Also shown in computer environment 10 is an agent process 34. Agent process 34 is in communication with server process 24 by way of communications path 32. Agent process 34 is also in communication with store process 40 by way of communications path 38. Device 44 is in communication with agent process 34 by way of communication paths 42 and 46.

There can be several circumstances where secure information is transported and utilized by various components of the computer environment 10. The secure information needs to be kept secure in order to provide proper protection of the secure information.

A software container is utilized to provide secure handling of secure information. A container is an object that stores other objects (its elements), and that has methods for accessing its elements. A container "owns" its elements: the lifetime of an element stored in a container cannot exceed that of the Container itself. A remote call to the container is used to pass a re-created local copy of the secure information (also referred to herein as a secret), which is later deleted when the secret is no longer required. A secret can take on different forms within the computer environment. A secret may be a username, a password, a Personal Identification Number (PIN), an account number, a user-identifier, an encryption key, a path where secure information is stored, or the like. The software container is able to receive the secret in clear text form and provide a plurality of representations of the secret, such that the secret cannot be discerned. Based on the application where the secret will be stored or used, the software container provides a representation of the secret for the particular use.

The handling of secrets include the following different aspects: temporary storage of a secret in memory, display of a secret, logging of a secret, transmission of a secret between processes, and secrets in System Query Language (SQL) queries (in the query text and/or result set). In one scenario a secret needs to be stored in memory for a period of time, which can be significant. The period of time can be as long as the lifetime of a component (i.e. agent from startup to shutdown) or as short as a duration of execution of a command. In this type of scenario, secrets must not be in memory in a clear text form. Keeping secrets in memory in clear text or in obfuscated form is not recommended.

Regarding the display of a secret, when a secret is displayed in a User Interface (UI), the secret must be displayed as a text string (e.g. a series of asterisks) such that the secret is not discernable from the text string.

If a secret needs to be logged in a trace file, the secret must be logged encrypted, or logged as a string of placeholder characters (such as asterisks) from which the secret cannot be reconstructed. Logging secrets in clear text or obfuscated form is not recommended.

If a secret needs to be communicated between processes, it must be encrypted. Transmitting secrets in clear text or obfuscated form is not recommended.

If a secret may be contained in the text of a query and/or in the result set of a query. When such a query is sent to a database for execution, the database connection or the secret itself must be encrypted as described above with respect to transmission of secrets. If the text of a query or its result set is logged, such logging is to be done in compliance with logging of a secret as described above. If text of a query or its result set is displayed, it is to be done in compliance with the display of a secret as recited above. If the result of a query contains a secret that needs to be kept in memory, it is to be done in compliance with the storing of a secret in memory described above.

The rules described above apply to multiple areas of the computer environment and manifest themselves in different use cases. For each area/use case, one or more of the rules is applicable and must be addressed.

An example will be discussed with respect to FIG. 1. In this example the secret will be the access information for device 44. The secret will traverse the computer environment 10 where it will be stored and utilized eventually arriving at agent 34 where the secret will be used by agent process 34 to access device 44.

User 14 enters device 44 access information via computer 12. The software container will receive the access information (the secret) and will store the secret in process memory (not shown) of console 18 as well as storing the secret in local persistent storage 20. In conventional systems, the secret will be reflected back on the display of computer 12 in the form of a text string from which the secret is not discernable. Typically this is accomplished by providing a string of asterisks such that a person viewing the display screen would not be able to determine the password for the username. The same thing happens in this environment 10, wherein the software container receives the secret and for use by the display the secret is represented as a string of asterisks. Unlike conventional systems that would store the secret in process memory and/or local data storage 20 in the clear text form that would be discernable by a nefarious party, by way of the presently described method for providing a framework for secure information lifecycle, the software container provides the secret as an encrypted secret in both the process memory of the console 18 and also in the local persistent data storage 20. In such a way a nefarious party could not gain access to process memory or local data storage 20 and determine the secret.

The secret is also forwarded to server process 24 along communications path 22. In some embodiments the communications path 22 may use a secure connection, which would encrypt a payload of a message from console 18 to server process 24 such that the secret, which is included in the payload, is not discernable to a nefarious party. However, this may not always be the case. In some environments the communications path 22 may not use a secure connection, thus the payload of a message from console 18 to server process 24 is not encrypted such that the secret, which is included in the payload, would be discernable to a nefarious party.

In contrast to conventional systems, in the present environment 10, the secret is provided as an encrypted secret in the payload of a message along the communications path 22, such that the secret is not discernable to someone snooping the communications path messages or intercepting the communications path messages, even in the event a secure connection is not used between console 18 and server process 24. In the event the communications path 22 is using a secure connection, the entire payload, including the encrypted secret, is encrypted and transmitted from the console 22 to the server process 24.

A similar situation exists for communications between console 18 and persistent data storage 28 (e.g., a database). In contrast to conventional systems, in the present environment 10, the secret is provided as an encrypted secret in the payload of a message along the communications path 26, such that the secret is not discernable to someone snooping the communications path messages or intercepting the communications path messages, even in the event a secure connection is not used between console 18 and persistent data storage 28. In the event the communications path 26 is using a secure connection, the entire payload, including the encrypted secret, is encrypted and transmitted from the console 22 to the persistent data storage 28. A similar situation exists between server process 24 and persistent data storage 28 via communications path 30, as well as for communications between server process 24 and agent process 34 via communications path 32.

Agent process 34 receives the encrypted secret from server process 24. Agent process 34 is in communications with store process 40 which may include the secret in data file such as a log file, a trace file or the like. In order to protect the secret in the data file the secret is represented in the form of a text string from which the secret is not discernable. Typically this is accomplished by providing a string of asterisks such that a person viewing the data file would not be able to determine the secret.

Agent process 34 is also in communication with device 44, and needs to utilize the secret to have access to and communicate with device 44.

As described above, the container can be queried for a different representation of a secret, e.g. wire format—for distribution over the wire, database format—for storing in the database, file format—for storing in the file, log format—for writing to a log file, and, finally, to clear format—to be used by an application in the case when a clear format is required. The container itself can be passed from one application component to another in the same process space or between processes with out revealing clear representation of the secret. By introducing the secret container an application has ability to control secret representation form. It controls what form of a secret should be used in any use case. The container holds the secure information during all stages of processing in a manner that prevents unauthorized parties from gaining access to the secret in clear form.

Figure 2:
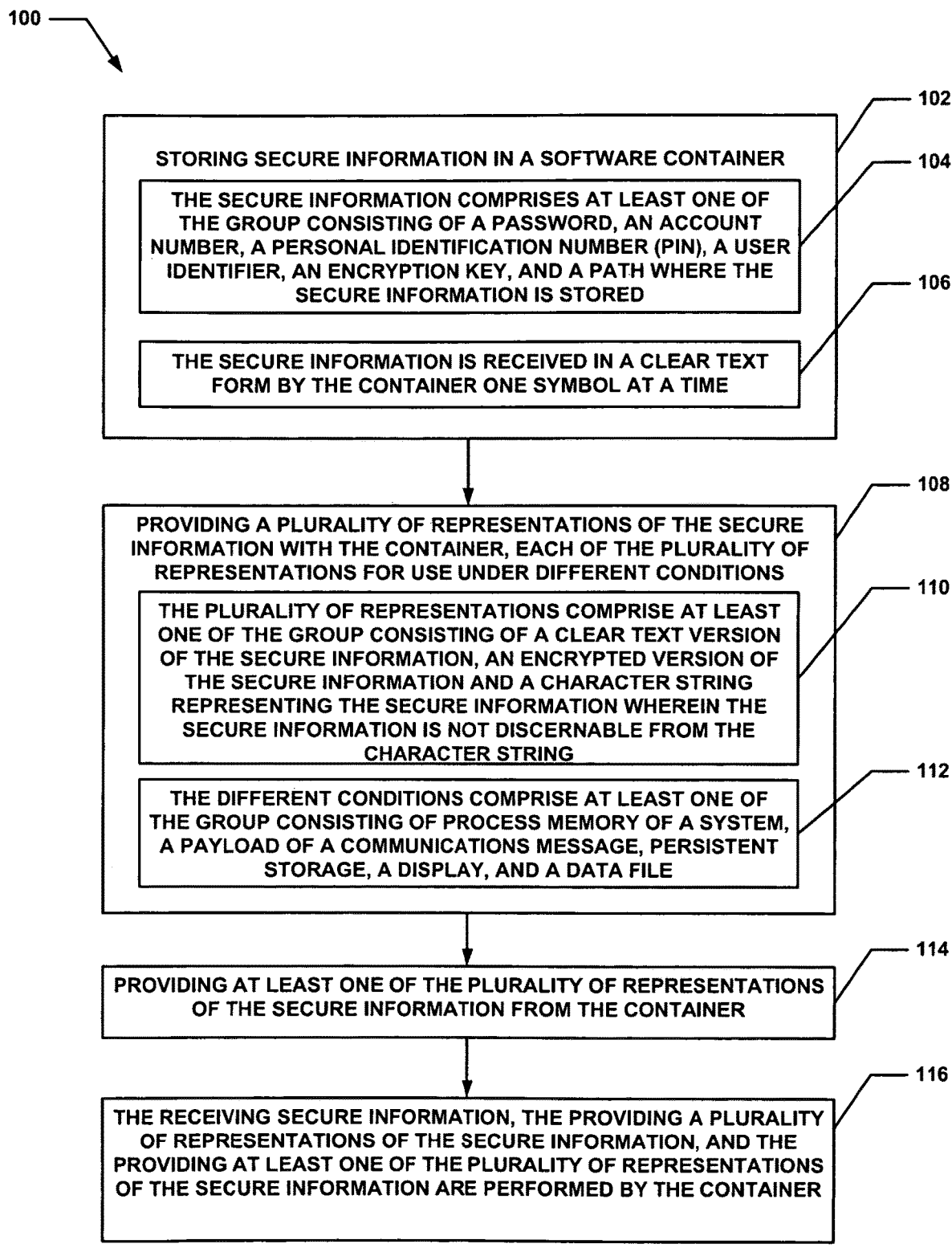
FIG. 2 comprises flow diagram of a particular embodiment of a computer implemented method of providing a framework for secure information lifecycle.

A flow chart of a particular embodiment of the presently disclosed method is depicted in FIG. 2. The rectangular elements are herein denoted "processing blocks" and represent computer software instructions or groups of instructions. The processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method for providing secure information is shown. Method 100 begins with processing block 102, which discloses storing secure information in a software container. The secure information may be received in any number of ways, for example from a user manually entering the secure information or received from another process. As recited in processing block 104, the secure information may be realized as a password, a Personal Identification Number (PIN), an account number, a user-identifier, an encryption key or the like. As shown in processing block 106 storing secure information comprises receiving the secure information in a clear text form one symbol at a time by the software container.

Processing block 108 states providing a plurality of representations of the secure information with the container, each of the plurality of representations for use under different conditions. As shown in processing block 110, the plurality of representations comprise at least one of the group consisting of a clear text version of the secure information, an encrypted version of the secure information, and a character string representing the secure information wherein the secure information is not discernable from the character string. As further shown in processing block 112, the different conditions comprise at least one of the group consisting of storing in process memory of a system, transmission in a payload of a communications message, storing in persistent storage, showing in a display, and storing in a data file. In a particular example, the secure information is provided as encrypted information for use in a process memory of a system, a payload of a communications message, persistent storage and a data file. In another particular example, the secure information is provided as a character string representing the secure information for use in a display and a data file. The data file may be a file such as a log file, a trace file or the like. In order to protect the secure information in the data file the secure information is represented in the form of a text string from which the secret is not discernable. Typically this is accomplished by providing a string of asterisks such that a person viewing the data file would not be able to determine the secret.

Processing block 114 discloses providing at least one of the plurality of representations of the secure information from the container. Processing block 116 states wherein the receiving secure information, the providing a plurality of representations of the secure information, and the providing at least one of the plurality of representations of the secure information are performed by the container.

Figure 3:
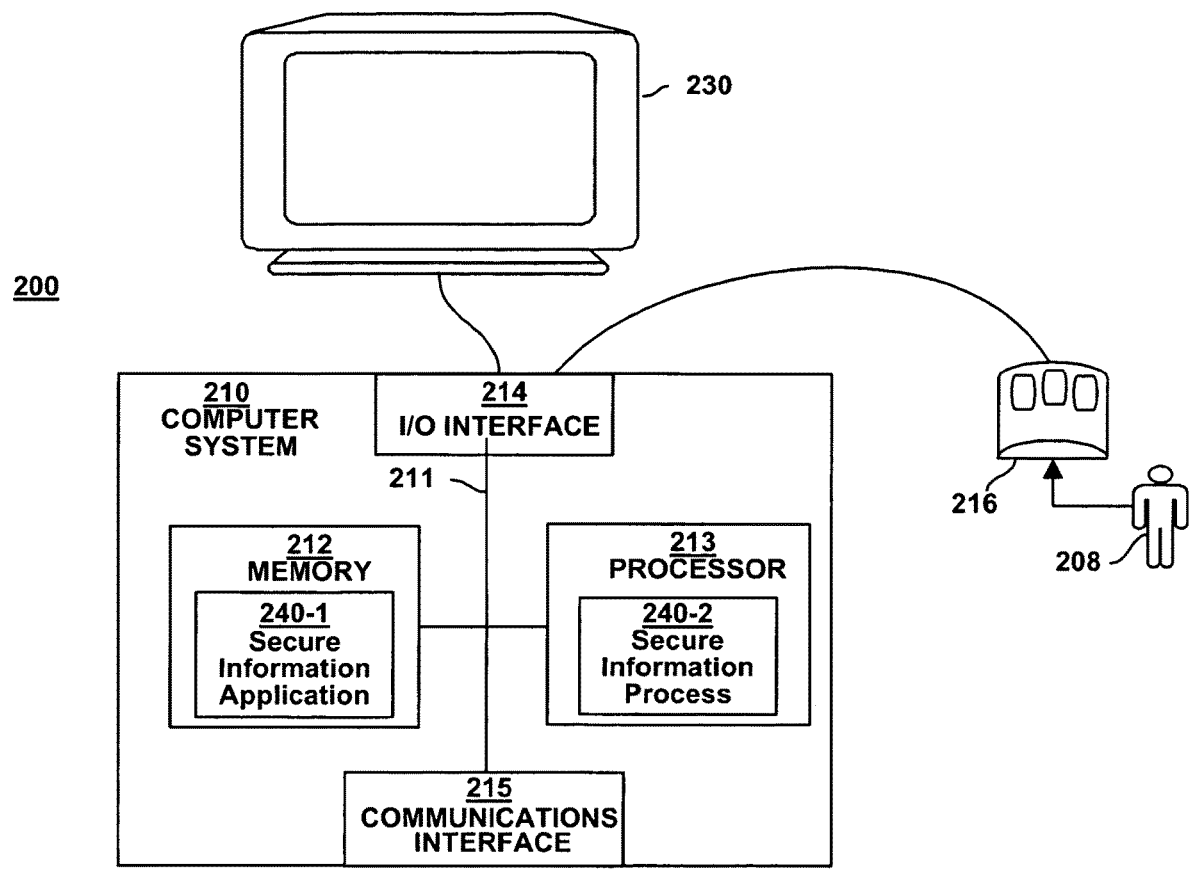
FIG. 3 illustrates an example computer system architecture for a computer system that provides a framework for secure information lifecycle in accordance with embodiments of the invention.

FIG. 3 is a block diagram illustrating example architecture of a computer system 210 that executes, runs, interprets, operates or otherwise performs a secure information operating application 240-1 and secure information operating process 240-2 suitable for use in explaining example configurations disclosed herein. The computer system 210 may be any type of computerized device such as a personal computer, workstation, portable computing device, console, laptop, network terminal or the like. An input device 216 (e.g., one or more customer/developer controlled devices such as a keyboard, mouse, etc.) couples to processor 213 through I/O interface 214, and enables a customer 208 to provide input commands, and generally control the graphical customer interface that the secure information operating application 240-1 and process 240-2 provides on the display 230. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a secure information operating application 240-1 as explained herein. The secure information operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a secure information operating application 240-1. Execution of a secure information operating application 240-1 in this manner produces processing functionality in the secure information operating process 240-2. In other words, the secure information operating process 240-2 represents one or more portions or runtime instances of a secure information operating application 240-1 (or the entire a secure information operating application 240-1) performing or executing within or upon the processor 213 in the computerized device 210 at runtime.

It is noted that example configurations disclosed herein include the secure information operating application 240-1 itself (i.e., in the form of un-executed or nonperforming logic instructions and/or data). The secure information operating application 240-1 may be stored on a computer readable medium (such as a floppy disk), hard disk, electronic, magnetic, optical, or other computer readable medium. A secure information operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a secure information operating application 240-1 in the processor 213 as the secure information operating process 240-2. Those skilled in the art will understand that the computer system 210 may include other processes and/or software and hardware components, such as an operating system not shown in this example.

A display 230 need not be coupled directly to computer system 210. For example, the secure information operating application 240-1 can be executed on a remotely accessible computerized device via the network interface 215. In this instance, the graphical customer interface may be displayed locally to a customer 208 of the remote computer, and execution of the processing herein may be client-server based.

During operation, processor 213 of computer system 210 accesses memory system 212 via the interconnect 211 in order to launch, run, execute, interpret or otherwise perform the logic instructions of the secure information application 240-1. Execution of secure information application 240-1 produces processing functionality in secure information process 240-2. In other words, the secure information process 240-2 represents one or more portions of the secure information application 240-1 (or the entire application) performing within or upon the processor 213 in the computer system 210.

It should be noted that, in addition to the secure information process 240-2, embodiments herein include the secure information application 240-1 itself (i.e., the unexecuted or non-performing logic instructions and/or data). The secure information application 240-1 can be stored on a computer readable medium such as a floppy disk, hard disk, or optical medium. The secure information application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of secure information application 240-1 in processor 213 as the secure information process 240-2. Those skilled in the art will understand that the computer system 210 can include other processes and/or software and hardware components, such as an operating system that controls allocation and use of hardware resources associated with the computer system 210.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
    receiving, at a first processing device, secret information in clear text form, the secret information being utilizable for accessing a second processing device different than the first processing device;
    storing the secret information in a secure software container in a local storage associated with the first processing device, the secure software container controlling access to the secret information by the first processing device and one or more additional processing devices in a communication path between the first processing device and the second processing device;
    generating, in the secure software container, a plurality of representations of the secret information that do not reveal the clear text form of the secret information, each of the plurality of representations being associated with a corresponding one of a plurality of conditions of use of the secret information, wherein the plurality of representations comprises a wire format representation, a database format representation, a file format representation, a log format representation, and a display format representation;
    receiving, at the secure software container, a request for access to the secret information from a given one of the additional processing devices in the communication path between the first processing device and the second processing device;
    determining a condition of use of the secret information by the given additional processing device;
    selecting one of the two or more representations of the secret information based at least in part on the determined condition of use of the secret information by the given additional processing device; and
    providing, from the secure software container to the given additional processing device, the selected representation of the secret information.

2. The method of claim 1 wherein the second processing device comprises an agent process deployed on a storage element, the agent process being configured to gather data about the storage element utilizing the secret information in clear text form, the data about the storage element being made available to at least one of the first processing device and one or more of the additional processing devices in the communication path.

3. The method of claim 1 further comprising transmitting the secure software container from the first processing device to a destination processing device, the transmitted secure software container being configured to release one or more selected representations of the secret information from the secure software container to the destination processing device, the destination processing device comprising one of: the second processing device; and a selected one of the one or more additional processing devices.

4. The method of claim 1 wherein the secret information comprises at least one of a username, a password, a personal identification number, an account number, a user identifier, an encryption key, and a path to a location where secure information is stored.

5. The method of claim 1 wherein the local storage associated with the first processing device comprises a memory associated with a process running on the first processing device, the secure software container preventing access in the memory to the secret information in clear text form.

6. The method of claim 1 wherein the local storage associated with the first processing device comprises a persistent storage, the secure software container preventing access in the persistent storage to the secret information in clear text form.

7. The method of claim 1 wherein a given one of the plurality of conditions of use of the secret information comprises storage of the secret information in at least one of a memory and a persistent storage, and wherein a given one of the plurality of representations of the secret information for the given condition of use comprises the file format representation comprising an encrypted version of the secret information.

8. The method of claim 1 wherein a given one of the plurality of conditions of use of the secret information comprises display of the secret information, and wherein a given one of the plurality of representations of the secret information for the given condition of use comprises the display format representation comprising a text string comprising a series of a designated character.

9. The method of claim 1 wherein a given one of the plurality of conditions of use of the secret information comprises logging the secret information, and wherein a given one of the plurality of representations of the secret information for the given condition of use comprises the log format representation comprising a text string comprising a series of placeholder characters.

10. The method of claim 1 wherein a given one of the plurality of conditions of use of the secret information comprises transmitting the secret information between two processing devices in the communication path, and wherein a given one of the plurality of representations of the secret information for the given condition of use comprises the wire format representation comprising an encrypted version of the secret information.

11. The method of claim 1 wherein a given one of the plurality of conditions of use of the secret information comprises providing the secret information in a query for execution by a database, and wherein a given one of the plurality of representations of the secret information for the given condition of use comprises the database format representation comprising an encrypted version of the secret information.

12. The method of claim 1 wherein the secure software container comprises a first object that stores the secret information in clear text form as a second object within the first object, a lifetime of the second object not exceeding a lifetime of the first object.

13. The method of claim 1 wherein receiving the request for access to the secret information at the secure software container comprises receiving a remote call at the secure software container, and wherein providing the selected representation of the secret information from the secure software container to the given additional processing device comprises passing a re-created local copy of the secret information in the form of the selected representation to the given additional processing device.

14. An apparatus comprising:
at least a first processing device comprising a processor coupled to a memory;
the first processing device being configured:
to receive secret information in clear text form, the secret information being utilizable for accessing a second processing device different than the first processing device;
to store the secret information in a secure software container in a local storage associated with the first processing device, the secure software container controlling access to the secret information by the first processing device and one or more additional processing devices in a communication path between the first processing device and the second processing device;
to generate, in the secure software container, a plurality of representations of the secret information that do not reveal the clear text form of the secret information, each of the plurality of representations being associated with a corresponding one of a plurality of conditions of use of the secret information, wherein the plurality of representations comprises a wire format representation, a database format representation, a file format representation, a log format representation, and a display format representation;
to receive, at the secure software container, a request for access to the secret information from a given one of the additional processing devices in the communication path between the first processing device and the second processing device;
to determine a condition of use of the secret information by the given additional processing device;
to select one of the plurality or more representations of the secret information based at least in part on the determined condition of use of the secret information by the given additional processing device; and
to provide, from the secure software container to the given additional processing device, the selected representation of the secret information.

15. The apparatus of claim 14 wherein the second processing device comprises an agent process deployed on a storage element, the agent process being configured to gather data about the storage element utilizing the secret information in clear text form, the data about the storage element being made available to at least one of the first processing device and one or more of the additional processing devices in the communication path.

16. The apparatus of claim 14 wherein the first processing device is further configured to transmit the secure software container to a destination processing device, the transmitted secure software container being configured to release one or more selected representations of the secret information to the destination processing device, the destination processing device comprising one of: the second processing device; and a selected one of the one or more additional processing devices.

17. The apparatus of claim 14 wherein the secret information comprises at least one of a username, a password, a personal identification number, an account number, a user identifier, an encryption key, and a path to a location where secure information is stored.

18. A computer program product comprising a non-transitory processor-readable storage medium having stored therein program code of one or more software programs, wherein the program code when executed by at least a first processing device causes the first processing device:
to receive secret information in clear text form, the secret information being utilizable for accessing a second processing device different than the first processing device;
to store the secret information in a secure software container in a local storage associated with the first processing device, the secure software container controlling access to the secret information by the first processing device and one or more additional processing devices in a communication path between the first processing device and the second processing device;
to generate, in the secure software container, a plurality of representations of the secret information that do not reveal the clear text form of the secret information, each of the plurality of representations being associated with a corresponding one of a plurality of conditions of use of the secret information, wherein the plurality of representations comprises a wire format representation, a database format representation, a file format representation, a log format representation, and a display format representation;
to receive, at the secure software container, a request for access to the secret information from a given one of the additional processing devices in the communication path between the first processing device and the second processing device;
to determine a condition of use of the secret information by the given additional processing device;
to select one of the plurality or more representations of the secret information based at least in part on the determined condition of use of the secret information by the given additional processing device; and
to provide, from the secure software container to the given additional processing device, the selected representation of the secret information.

19. The computer program product of claim 18 wherein the second processing device comprises an agent process deployed on a storage element, the agent process being configured to gather data about the storage element utilizing the secret information in clear text form, the data about the storage element being made available to at least one of the first processing device and one or more of the additional processing devices in the communication path.

20. The computer program product of claim 18 wherein the program code when executed further causes the first processing device to transmit the secure software container to a destination processing device, the transmitted secure software container being configured to release one or more selected representations of the secret information to the destination processing device, the destination processing device comprising one of: the second processing device and; a selected one of the one or more additional processing devices.

21. The computer program product of claim 18 wherein the secret information comprises at least one of a username, a password, a personal identification number, an account number, a user identifier, an encryption key, and a path to a location where secure information is stored.

\* \* \* \* \*